United States Patent

Moser et al.

[11] 4,018,763
[45] Apr. 19, 1977

[54] PROCESS FOR THE MANUFACTURE OF BASIC OXAZINE DYES

[75] Inventors: Peter Moser, Binningen; Alex Nicopoulos, Basel, both of Switzerland

[73] Assignee: Ciba-Geigy Corporation, Ardsley, N.Y.

[22] Filed: Apr. 14, 1975

[21] Appl. No.: 567,795

[30] Foreign Application Priority Data

Apr. 29, 1974 Switzerland .................... 5873/74

[52] U.S. Cl. ............................................. 260/245
[51] Int. Cl.² ...................................... C07D 265/12
[58] Field of Search ....................... 260/244, 245

[56] References Cited

UNITED STATES PATENTS

| | | | |
|---|---|---|---|
| 3,048,586 | 8/1962 | Girard | 260/244 R |
| 3,629,248 | 12/1971 | Schafer et al. | 260/242 |
| 3,681,347 | 8/1972 | Herz et al. | 260/242 |

FOREIGN PATENTS OR APPLICATIONS 2,121,198  8/1972  France

OTHER PUBLICATIONS

Organic Syntheses, vol. 2, Ed. by Blatt, 1943, John Wiley & Sons Inc., London, pp. 223–225.

*Primary Examiner*—Albert T. Meyers
*Assistant Examiner*—D. W. Robinson
*Attorney, Agent, or Firm*—Joseph G. Kolodny; Edward McC. Roberts; Prabodh I. Almaula

[57] ABSTRACT

A process for the preparation of basic oxazine dyes of the formula

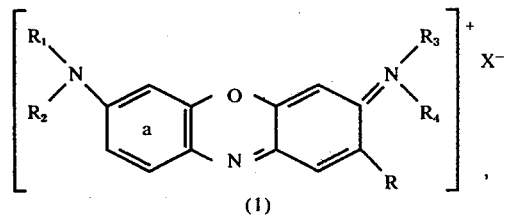

wherein R represents a low molecular alkoxy or alkyl group which is substituted or unsubstituted, $R_1$ represents a low molecular alkyl group which is substituted or unsubstituted, $R_2$ represents a low molecular alkyl group which is substituted or unsubstituted or an aryl radical, and each of $R_3$ and $R_4$ independently represents hydrogen or a low molecular alkyl radical which is substituted or unsubstituted, and $R_1$ may be attached to $R_2$ and $R_3$ to $R_4$ through a heteroatom, and wherein the ring a can carry further non-ionogenic substituents or a fused benzene ring, and $X^-$ represents an anion, which process comprises treating a compound of the formula

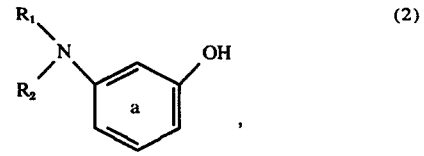

wherein $R_1$, $R_2$ and a have the meanings previously assigned to them, with nitrous acid in a polar, water-miscible solvent and adding to the resultant nitrosation mixture, without isolating the nitroso compound, a diamine of the formula

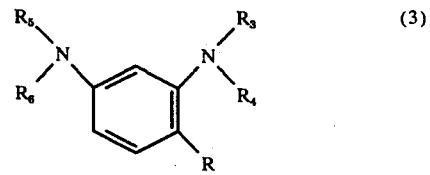

wherein R, $R_3$ and $R_4$ have the indicated meanings and each of $R_5$ and $R_6$ represents hydrogen or a low molecular alkyl group.

8 Claims, No Drawings

PROCESS FOR THE MANUFACTURE OF BASIC OXAZINE DYES

The present invention provides a novel process for the manufacture of basic oxazine dyes of the formula

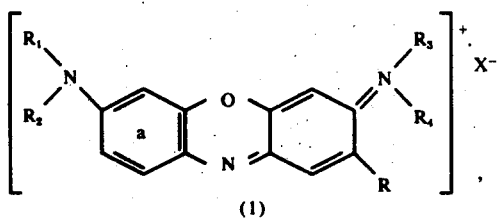

wherein R represents a low molecular alkoxy or alkyl group which is substituted or unsubstituted, $R_1$ represents a low molecular alkyl group which is substituted or unsubstituted, $R_2$ represents a low molecular alkyl group which is substituted or unsubstituted or an aryl radical, and each of $R_3$ and $R_4$ independently represents hydrogen or a low molecular alkyl radical which is substituted or unsubstituted, and $R_1$ may be attached to $R_2$ and $R_3$ to $R_4$ through a heteroatom, and wherein the ring a can carry further non-ionogenic substituents or a fused benzene ring, and $X^-$ represents an anion, which process comprises treating a compound of the formula

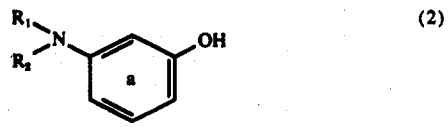

wherein $R_1$, $R_2$ and a have the meanings previously assigned to them, with nitrous acid in a polar, water-miscible solvent and adding to the resultant nitrosation mixture, without isolating the nitroso compound, a diamine of the formula

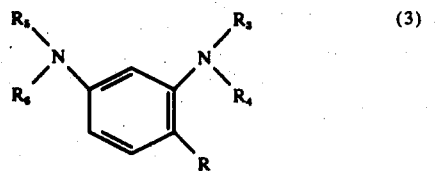

wherein R, $R_3$ and $R_4$ have the indicated meanings and each of $R_5$ and $R_6$ represents hydrogen or a low molecular alkyl group.

The term low molecular is to be understood in this connection as meaning radicals of 1 to 4 carbon atoms.

Most of the oxazine dyes of the formula (1) are known and can be manufactured according to the particulars of French patent 2 121 198, for example by reacting a 3-amino-6-nitrosophenol-hydrochloride in acetic acid medium with an aminohydroquinone dialkyl ether.

Compared with this process, the process according to the invention is characterised by its greater simplicity and economy. The novel process combining two steps in one permits a mode of operation in which the isolation of the aggressive nitrosophenols is avoided. In addition, there is a saving of large amounts of solvent, since the treatment with nitrous acid and the condensation are carried out in the same medium.

The following groups of solvents are especially suitable for the process according to the invention:
low molecular alcohols, such as methanol, ethanol, propanol, isopropanol or glycol,
cyclic ethers, such as dioxan and tetrahydrofuran,
low molecular, aliphatic carboxylic acids, such as formic acid and acetic acid,
aprotic, dipolar solvents, i.e. solvents with a high dipole moment (n>2.5D) and a high dielectric coefficient ($\epsilon$>15), e.g. dimethyl sulphoxide, tetramethylene sulphone, acetone, acetonitrile and, in particular, the N,N-di-substituted acid amides, such as dimethyl formamide, dimethyl acetamide, N-methylpyrrolidone and hexamethylphosphoric acid triamide.

A preferred method of carrying out the oxazine synthesis according to the invention consists in using a N,N-di-substituted acid amide as solvent, especially dimethyl formamide, dimethyl sulphoxide, tetramethylene sulphone or acetonitrile.

Surprisingly, the basic oxazine dye precipitates in virtually quantitative amount in crystalline form and in very good purity from these latter solvents, especially from dimethyl formamide, while impurities remain in solution. A very pure, practically salt-free dye of high colour strength is obtained in this way and there is no necessity for the isolation and purification processes (e.g. concentrating and salting out) required when using other solvents. As a general rule, the process is carried out in an aqueous-organic, acid medium. The treatment with nitrous acid is effected preferably at temperatures below 50° C, the condensation at 20° to 120° C, preferably at 30° to 80° C.

The treatment with nitrous acid is carried out in the presence of a strong inorganic acid, in particular hydrochloric or sulphuric acid. The acid originating from the nitrosation normally also suffices to keep the reaction mixture acid during the condensation. If acids which contain water are used, for example concentrated hydrochloric acid, a surplus of acid should be avoided since otherwise the yield will fall.

If the process is carried out in a solvent from which the cationic dye does not precipitate or only partly precipitates, for example methanol, ethanol or dioxan, then desirably the procedure to be followed is that the bulk of the alcohol or ether is distilled off from the condensation mixture, the residue is taken up in hot water, filtered, and the dye is salted out from the filtrate.

Suitable compounds of the formula (2) are primarily 3-dialkyl-aminophenols the alkyl radicals of which can be substituted e.g. by halogen, especially chlorine, cyano, hydroxy, alkoxy, especially methoxy and ethoxy, phenoxy, phenyl or dialkyl-amino groups. Mention is also to be made of 3-piperidinophenol and 3-morpholinophenol.

The aminophenol of the formula (2) can carry further substituents, preferably in 4-position, for example a halogen atom, e.g. chlorine, an alkoxy group, e.g. methoxy or an alkyl group, especially a methyl group.

On account of their easy accessibility, the 3-dimethylaminophenol and 3-diethylaminophenol are preferred.

As m-phenylenediamines there are used preferably those of the formula

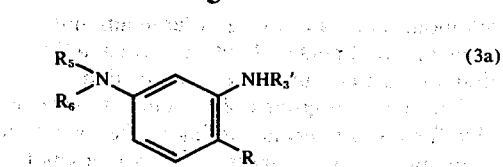

(3a)

wherein R'$_3$ is a lower alkyl radical which is unsubstituted or substituted by halogen, especially chlorine, cyano, hydroxy, alkoxy, especially methoxy and ethoxy, phenoxy, phenyl or dialkylamino groups or is preferably hydrogen, and the other symbols have the meanings assigned to them in formula (3). Preferably, R$_5$ and R$_6$ are both hydrogen atoms or methyl groups. The substituent R is preferably a lower unbranched alkyl or alkoxy group, especially methyl or methoxy.

The dyes are suitable for dyeing or printing cellulose fibres mordanted with tannic acid, silk, leather or man-made synthetic fibres, such as acetate rayon, polyamide fibres or acid modified polyamide or polyester fibres, but especially fibres which contain polyacrylonitrile as well as those containing polyvinylidene cyanide.

The following Examples illustrate the invention, the parts and percentages being by weight and the relationship between parts by weight and parts by volume being the same as that between the gram and the milliliter.

EXAMPLE 1 a. 13.8 parts of m-N,N-dimethylaminophenol are added to 150 parts by volume of methanol. The solution is cooled to −2° to 0° C and subsequently treated with 13.8 parts by volume of a sodium nitrite solution of 50 vol.%. Then 25 parts by volume of 38% hydrochloric acid are added as quickly as possible at once and without further cooling. A brownish yellow suspension is obtained and the temperature rises to c. 36° C. The temperature of the reaction mixture is then kept at 33°–35° C and after c. 15 minutes, when a surplus of nitrite is no longer detectable, an additional 2 to 3 drops of the nitrite solution (50 vo.%) are added and the suspension is stirred for 1 hour. The surplus nitrite is then removed by addition of a small amount of m-N,N-dimethylaminophenol.

b. A solution of 13.8 parts of 3-amino-4-methoxyaniline in 75 to 100 parts by volume of methanol is added to the nitroso suspension of a). The reaction mixture is adjusted to a temperature of 50°–52° C and the formation of the blue dye commences at once. The batch is stirred for 2 hours at this temperature during which time a portion of the dye precipitates. Then c. 200 parts by volume of methanol are distilled off at 70°–75° C to give a thick suspension which is bulked to a volume of 500 parts with hot water. The resultant dye solution is treated at 80° C with 1 part of formaldehyde (as 30–35% aqueous solution). After 2 hours the reaction mixture is clarified by suction filtration at 80° C. The filter residue is washed with hot water. The dye is precipitated from the filtrate by addition of zinc chloride and sodium chloride and filtered off.

The dye is dried in vacuo at 60°–70° C to yield 40 parts of the dye of the formula

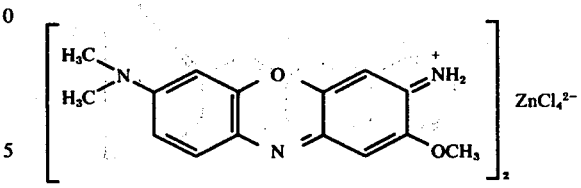

EXAMPLE 2 a. 13.8 parts of m-N,N-dimethylaminophenol are added to 150 parts by volume of dimethyl formamide. The solution is cooled to −2°–0° C and then treated with a solution of 6.9 parts of sodium nitrite in 7 parts of water. Then 25 parts by volume of hydrochloric acid (38%) are poured into the mixture without further cooling. An orange brown suspension is formed and the internal temperature rises to c. 45° C. The suspension is stirred at 35° C ± for 1 hour.

b. A solution of 13.8 parts of 2,4-diaminoanisol in 50 parts by volume of dimethyl formamide is added to the nitroso suspension of a). The temperature is raised within 20 minutes to c.50° C and the mixture is stirred at this temperature for 2 hours. The dye formation commences after a brief time and the dye precipitates in fine, crystalline form. The reaction mixture is cooled to room temperature and the dye is filtered off with suction. The filter product is well filtered with suction, washed in small amounts with 50 to 100 parts by volume of dimethyl formamide, finally with 100 parts by volume of ethyl acetate and the dye is dried at 60°–70° C in vacuo. Yield: 29.0 parts of virtually salt-free dye of the formula given in Example 1.

The same dye is obtained in similar yield and quality by using a corresponding amount of 60% sulphuric acid instead of the 38% hydrochloric acid.

The same dye is obtained in similar quality by using corresponding amounts of dimethyl sulphoxide, tetramethylene sulphone or acetonitrile instead of dimethyl sulphoxide.

The dyes listed in column III of the following Table are obtained in analogous manner with corresponding good yields from the starting compounds indicated in columns I and II.

| I | II | III | Shade on PAC |
|---|----|-----|--------------|
| ₂N-C₆H₄-OH (3-dimethylamino phenol) | H₂N-C₆H₃(NH₂)-OC₂H₅ | dimethylamino diphenylamine oxazine with OC₂H₅ | greenish blue |
| (C₂H₅)₂N-C₆H₄-OH | H₂N-C₆H₃(NH₂)-OCH₃ | diethylamino diphenylamine oxazine with OCH₃ | " |

-continued

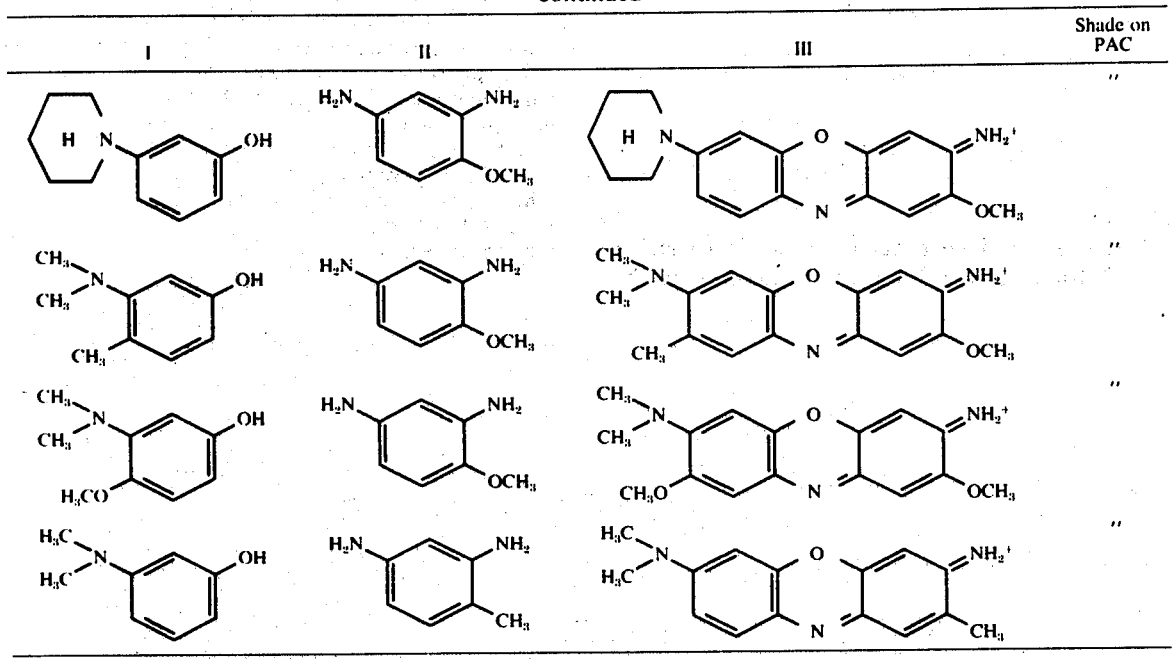

We claim:
1. A process for the preparation of a basic oxazine dye of the formula

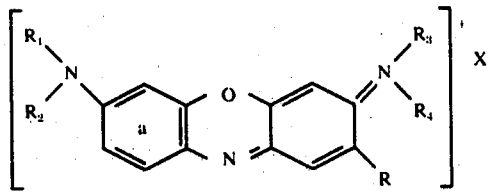

wherein
R is lower alkoxy or lower alkyl,
$R_1$ and $R_2$ are independently lower alkyl which is unsubstituted or substituted by halo, cyano, hydroxy, methoxy, ethoxy, phenoxy or phenyl; or
$R_1$ and $R_2$ together with the nitrogen to which they are attached represent piperidino or morpholino,
$R_3$ and $R_4$ are independently hydrogen or lower alkyl which is unsubstituted or substituted by halo, cyano, hydroxy, methoxy, ethoxy, phenoxy or phenyl,
the benzene ring a may be further substituted by halo, methoxy, methyl or a fused benzene ring, and
X is an anion
which comprises reacting a phenolic compound of the formula

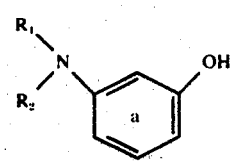

with nitrous acid at a temperature below 50° C in the presence of a strong inorganic acid and in a polar, water-miscible solvent selected from the group consisting of lower alcohols, cyclic ethers, lower aliphatic carboxylic acids and an aprotic dipolar solvent having a dipole moment greater than 2.5 and a dielectric coefficient greater than 15, to form the corresponding nitroso compound in the reaction mixture,
adding to said reaction mixture, without isolation of said nitroso compound, a diamine of the formula

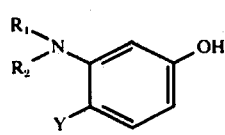

wherein
$R_5$ and $R_6$ are independently hydrogen or lower alkyl, to form said basic oxazine dye at a temperature between 20° to 120° C, and recovering said dye from the reaction mixture.
2. A process according to claim 1, wherein said solvent is dimethyl formamide, dimethyl acetamide, N-methylpyrrolidone, hexamethylphosphoric acid triamide, dimethyl sulfoxide, tetramethylene sulfone, acetone or acetonitrile.
3. A process according to claim 1, wherein said solvent is dimethyl formamide.
4. A process according to claim 1, wherein said phenolic compound is of the formula $$\begin{array}{c}R_1\\\diagdown\\R_2\end{array}N-\underset{Y}{\underset{|}{\bigcirc}}-OH$$

wherein
$R_1$ and $R_2$ are independently lower alkyl which is unsubstituted or substituted by halo, cyano, hydroxy, methoxy, ethoxy, phenoxy or phenyl, and
Y is hydrogen, methyl or methoxy.
5. A process according to claim 1, wherein said phenolic compound is of the formula

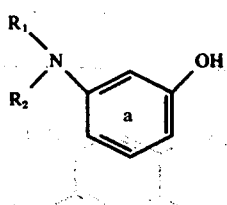

wherein $R_1$ and $R_2$ are independently lower alkyl which is unsubstituted or substituted by halo, cyano, hydroxy, methoxy, ethoxy, phenoxy or phenyl; or $R_1$ and $R_2$ together with the nitrogen to which they are attached represent piperidino or morpholino, and wherein the benzene ring $a$ is not further substituted.

6. A process according to claim 1, wherein said phenolic compound is 3-dimethylaminophenol or 3-diethylaminophenol.

7. A process according to claim 1, wherein $R_3$, $R_4$, $R_5$ and $R_6$ are hydrogen.

8. A process according to claim 1, wherein said diamine is 1,3-diamino-4-methylbenzene or 1,3-diamino-4-methoxybenzene.

* * * * *